(12) United States Patent
Kreuzer (10) Patent No.: US 7,275,924 B1
(45) Date of Patent: Oct. 2, 2007

(54) CONTAINER HAVING EXTRUDER FOR A MODELING COMPOUND

(75) Inventor: Jared Kreuzer, Providence, RI (US)

(73) Assignee: Hasbro, Inc., Pawtucket, RI (US)

( * ) Notice: Subject to any disclaimer, the term of this patent is extended or adjusted under 35 U.S.C. 154(b) by 218 days.

(21) Appl. No.: 11/118,923

(22) Filed: Apr. 29, 2005

(51) Int. Cl.
*B29C 47/12* (2006.01)
*B29C 47/54* (2006.01)

(52) U.S. Cl. .................. 425/169; 425/170; 425/192 R; 425/317; 425/376.1; 425/DIG. 57

(58) Field of Classification Search ............ 425/192 R, 425/DIG. 57, 376.1, 183, 317, 169, 170
See application file for complete search history.

(56) References Cited

U.S. PATENT DOCUMENTS

| | | | | |
|---|---|---|---|---|
| D193,310 | S | 7/1962 | Jacobs | D55/1 |
| 3,157,933 | A | 11/1964 | Boggild et al. | 25/11 |
| 3,264,685 | A * | 8/1966 | Boggild et al. | 425/183 |
| 4,076,476 | A | 2/1978 | Ventura | 425/183 |
| D270,162 | S | 8/1983 | Kay | D15/135 |
| 4,425,091 | A | 1/1984 | Prince | 425/589 |
| 5,165,941 | A | 11/1992 | Hawley | 425/148 |
| D343,177 | S | 1/1994 | Levy et al. | D15/135 |
| 5,562,927 | A | 10/1996 | Masuda et al. | 425/98 |
| 6,319,532 | B1 | 11/2001 | Pineault | 426/516 |
| D451,524 | S | 12/2001 | Morris | D15/135 |
| 6,328,549 | B1 | 12/2001 | Valyi et al. | 425/112 |
| 6,602,066 | B1 | 8/2003 | Heayes | 425/382.3 |
| 6,773,326 | B2 | 8/2004 | Jarvis | 446/297 |
| 2006/0083105 | A1 | 4/2006 | MacDonald et al. | 366/80 |
| 2006/0131788 | A1 | 6/2006 | Takigawa | 264/328.1 |

FOREIGN PATENT DOCUMENTS

JP        62083116 A  *  4/1987

OTHER PUBLICATIONS

U.S. Appl. No. 29/228,889, filed Apr. 29, 2005, and listing Jared Kreuzer as inventor (27087/41025) (16 pages).

* cited by examiner

*Primary Examiner*—Robert Davis
*Assistant Examiner*—Marissa W. Chaet
(74) *Attorney, Agent, or Firm*—Marshall Gerstein & Borun LLP (57) ABSTRACT

The invention is directed to a toy container having an integrated extruder for extruding a quantity of a deformable molding compound. The toy may include a container having a storage portion configured to receive and store components of a molding compound extrusion set, and an extruder portion having an extrusion opening and a receiving chamber configured to receive a quantity of the modeling compound. The toy may further include a lid moveably attached to the container and moveable between an open position and a closed position. The lid may have a plunger extending therefrom, and the receiving chamber may be configured to receive the plunger when the lid moves from the open position to the closed position. The plunger may engage a quantity of modeling compound disposed in the receiving chamber to force the modeling compound through the extruder opening as the lid moves from the open position to the closed position.

28 Claims, 8 Drawing Sheets

CONTAINER HAVING EXTRUDER FOR A MODELING COMPOUND

BACKGROUND OF THE INVENTION

The patent is directed to extruders for modeling compounds, and more particularly to a container for storing modeling compounds, molds, dies and other accessories having an integrated extruder for extruding the modeling compounds in various cross-sectional shapes.

Various extruders for extruding modeling compounds into various cross-sectional shapes have been previously described. For example, U.S. Pat. No. 3,157,933 to Boggild et al. discloses a toy extruder intended for use to form a relatively soft plastic material, such as modeling clay, into strips having a variety of different cross-sections. So as to appeal to children, the body portion of the extrusion device may be in the shape of a building or housing structure having a vertically disposed cylindrical bore provided therein and a passageway communicating between the lower portion of the cylindrical bore and an opening provided in a side of the building structure. A plurality of dies may be employed to enable a child to remove and replace a die having a differently shaped opening whenever a different design or shape of molded article is desired.

U.S. Pat. No. 4,076,476 to Ventura discloses a toy extrusion device for use with moldable dough-like material including an extruder housing, a container defining an extrusion chamber movably mounted in the housing for movement between loading and extruding positions. The container has opposed end portions respectively defining a filling or loading opening and an extrusion opening therein. A plunger is slidably mounted in the housing in position to enter the filling opening of the container in its first position to urge the play materials in the extrusion chamber through the extrusion opening. A manually operable lever is pivotally mounted on the housing for operating the plunger. The lever and the plunger have cooperating means formed thereon for converting pivotal movement of the lever into linear movement of the plunger whereby the plunger may be reciprocated into and out of the extrusion chamber.

U.S. Pat. No. 6,602,066 to Heayes discloses a toy including a chamber having a longitudinal axis, a hollow interior, a first opening, and a second opening. The toy includes a die coupled to the first opening of the chamber, and an extruder received at the second opening of the chamber. A cavity is defined and bound by the interior of the chamber, the first opening, and the extruder. The extruder is positioned to advance longitudinally through the chamber relative to the die. Rotation of the extruder causes the chamber and formable compound received within the cavity to rotate relative to the die, and advancement of the extruder forces the rotating formable compound through the die.

SUMMARY OF THE INVENTION

In one aspect the invention is directed to a toy for extruding a deformable molding compound. The toy may include a container having a container portion with a housing defining a cavity and a container opening. The container opening and the cavity may be configured to receive components of a molding compound extrusion set. The toy may further include a lid portion moveably attached to the container portion and moveable between an open position wherein the container opening is accessible from the exterior of the container and a closed position overlying the container opening. Still further, the toy may include an extruder assembly having a plunger portion attached to the lid portion, and an extruder portion disposed within the cavity of the container portion. The extruder portion may include an extruder opening and a receiving chamber, wherein the receiving chamber may be configured to receive a quantity of the molding compound, and to receive the plunger portion when the lid portion moves from the open position to the closed position. The plunger portion may engage a quantity of modeling compound disposed in the receiving chamber to force the modeling compound through the extruder opening when the lid portion moves from the open position to the closed position.

In another aspect, the invention is directed to a toy for extruding a deformable molding compound. The toy may include a container having a storage portion configured to receive and store components of a molding compound extrusion set, and an extruder portion having an extrusion opening and a receiving chamber configured to receive a quantity of the modeling compound. The toy may further include a lid moveably attached to the container and moveable between an open position and a closed position. The lid may have a plunger extending therefrom, and the receiving chamber may be configured to receive the plunger when the lid moves from the open position to the closed position. The plunger may engage a quantity of modeling compound disposed in the receiving chamber to force the modeling compound through the extruder opening as the lid moves from the open position to the closed position.

In a further aspect, the invention is directed to a toy for extruding a deformable molding compound. The toy may include a container having a storage portion configured to receive and store components of a molding compound extrusion set, and an extruder portion having an extrusion opening and a receiving chamber configured to receive a quantity of the modeling compound. The toy may further include a lid pivotally attached to the container and moveable between an open position and a closed position. The lid may have a plunger extending from an inner surface of the lid, and the receiving chamber may be configured to receive the plunger when the lid pivots from the open position to the closed position. The plunger may engage a quantity of modeling compound disposed in the receiving chamber to force the modeling compound through the extruder opening as the lid pivots from the open position to the closed position.

Additional aspects of the invention are defined by the claims of this patent.

DETAILED DESCRIPTION OF VARIOUS EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
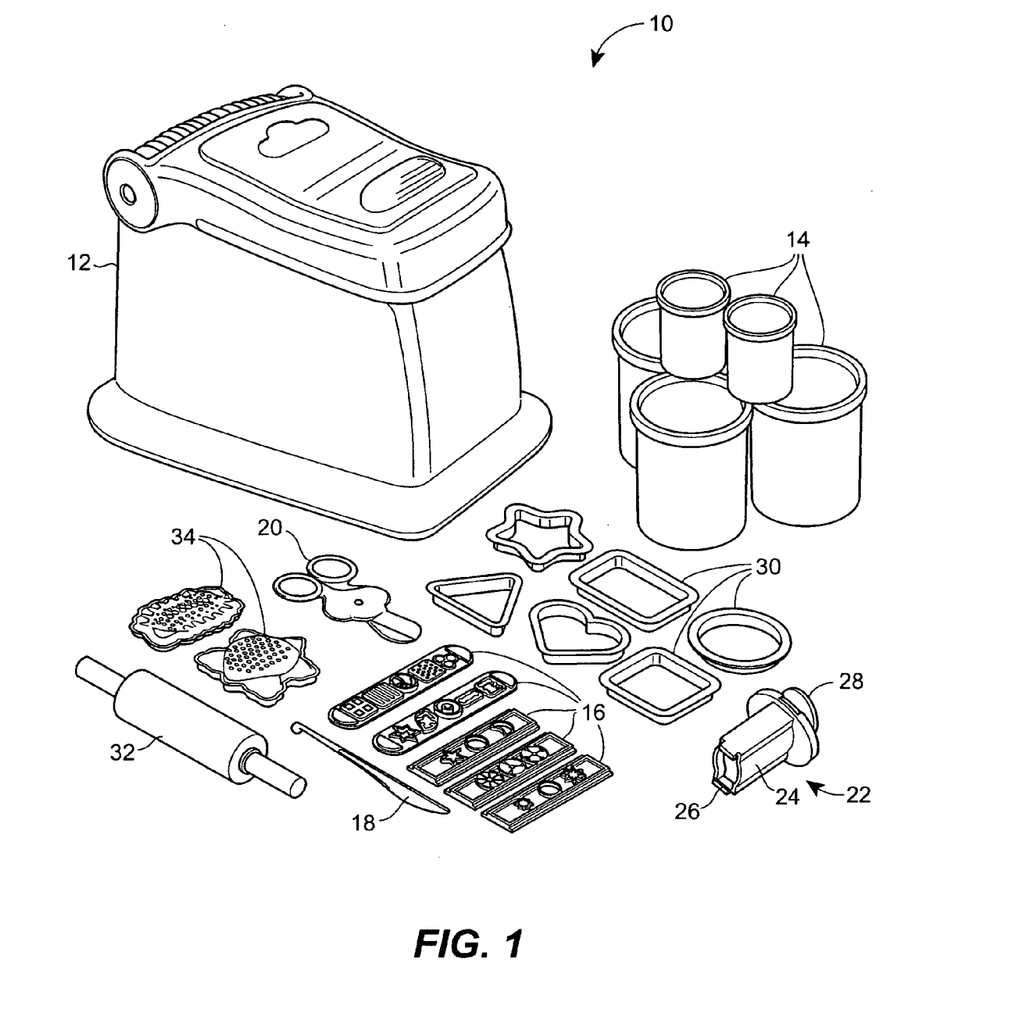
FIG. 1 is a perspective view of a molding compound extrusion set including a container having an extruder in accordance with the present invention.

Referring to FIG. 1, a molding compound extrusion set 10 may include a container 12 configured to receive and store the other components of the extrusion set 10, and to incorporate an extruder for extruding the molding compound into extrusions having varying cross-sectional shapes discussed more fully below. The extrusion set 10 may include a plurality of canisters 14 quantity of the molding compound to be extruded by the container 12. Each canister 14 may correspond to a particular quantity of the molding compound, such as by having a colored lid, body or labeling corresponding to the color of the molding compound stored therein. In order to allow a user to extrude the molding compound into extrusions having any of a number of desired cross-sectional shapes, the extrusion set 10 may further include a plurality of dies 16. The dies 16 may be attached proximate an extrusion opening of the extruder of container 12 such that the extruded molding compound may be forced through a desired one of the openings of the dies 16 to form the desired extrusion in a manner discussed more fully below. In order to facilitate the separation of the extruded molding compound from the container 12, the extrusion set 10 may further include a cutter 18, scissors 20, or other accessories for separating the extruded portion of the molding compound from the remaining portion of the molding compound disposed upstream of the dies 16 or the extruder opening of the container 12.

To further enhance the user's experience with the extrusion set 10, the extrusion set 10 may further include other accessories for manipulating the molding compound into various shapes as desired by the user. For example, the extrusion set 10 may further include hand-held extruder 22 that may be capable of extruding a smaller quantity of the molding compound than the extruder in the container 12. The hand-held extruder 22 may include a housing 24 defining a cavity for receiving the molding compound, and having a die attachment mechanism 26 for attaching the dies thereto. The hand-held extruder 22 may further include a plunger 28 for forcing the quantity of the molding compound through the opening in the housing 24 and/or the corresponding opening of the die 16. The plunger 28 may be removable from the housing 24 such that the molding compound may be inserted into the cavity of the housing 24. Once the molding compound is inserted, the plunger 28 may be inserted into the cavity of the housing 24 and forced through the housing 24 and/or the opening of the die 16 to extrude the molding compound.

In addition to extrusion accessories, the extrusion set 10 may include accessories for manipulating the molding compound in other ways to create desired shapes. Consequently, the extrusion set 10 may further include a plurality of cutters 30 that may cut a quantity of the molding compound that has been placed on a support surface and, if desired, flattened onto the support surface by a rolling pin 32. The extrusion set 10 may further include a plurality of molds 34 into which a quantity of the molding compound may be pressed by the user such that the molding compound may conform to the shapes of the inner surfaces of the molds 34. When the molding compound is removed from the molds 34, the molding compound may retain the shapes of the inner surfaces of the molds 34. Of course, those skilled in the art will understand that other accessories may be included with the extrusion set 10 for use by a user in manipulating the molding compound.

Figure 2:
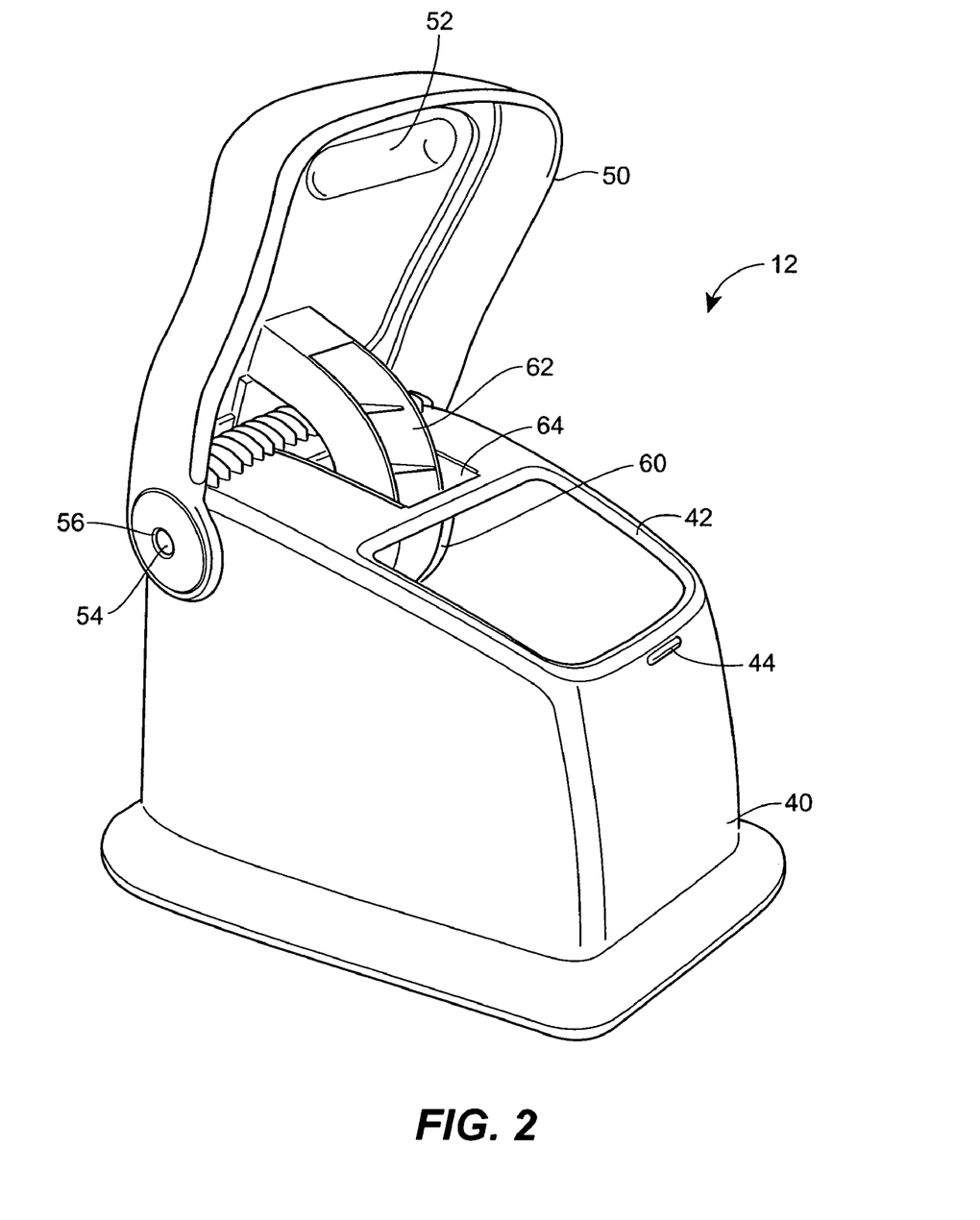
FIG. 2 is a perspective view of the container of FIG. 1 with the lid in an open position.

FIG. 2 illustrates one embodiment of the container 12 having an extruder integrated therein. The container 12 may include an outer housing 40 defining a cavity or container portion therein and including a container opening 42 adapted to receive the accessories of the molding compound extrusion set 10 illustrated in FIG. 1. The cavity defined by the housing 40 may be configured such that of the accessories of the extrusion set 10 may be received through the opening 42 and retained within the housing 40 simultaneously. The housing 40 may further include portion of a locking mechanism, such as detent 44, extending therefrom to engage a corresponding surface of a lid 50 of the container 12 to close the container 12 in a manner discussed more fully below. The lid 50 may be configured to cover the container opening 42 when the lid 50 is in a closed position, and may include a grip portion 52 for engagement by the user for opening and closing the lid 50. The lid 50 may be moveably attached to the housing 40 of the container 12 to allow the lid 50 to move between an open position as shown in FIG. 2 and a closed position as shown in FIG. 1. In the illustrated embodiment, the lid 50 may be pivotally attached to the housing 40 such that the lid 50 moves through an arcuate path between the closed position and the open position. The housing 40 may further include a pair of oppositely disposed and outwardly extending shafts 54 each engaging a corresponding opening 56 of the lid 50 such that the lid 50 pivots between the closed position and the open position about the shafts 54.

As previously discussed, the container 12 may include an integrated extruder for extruding the molding compound. The extruder may include an extruder portion 60 disposed within the housing 40, and a plunger 62 operatively connected to the lid 50. The extruder portion 60 may be supported by the housing 40 of the container 12, and may include a receiving chamber 64 for receiving a quantity of the molding compound and/or the plunger 62, and an extruder opening 68 (FIG. 3) through which the extruded molding compound may be discharged. As the lid 50 moves between the open position and the closed position, the plunger 62 may be free to move within the receiving chamber 64 of the extruder portion 60 such that the plunger 62 may apply pressure to a quantity of molding compound disposed within the receiving chamber 64 as discussed further below.

Figure 3:
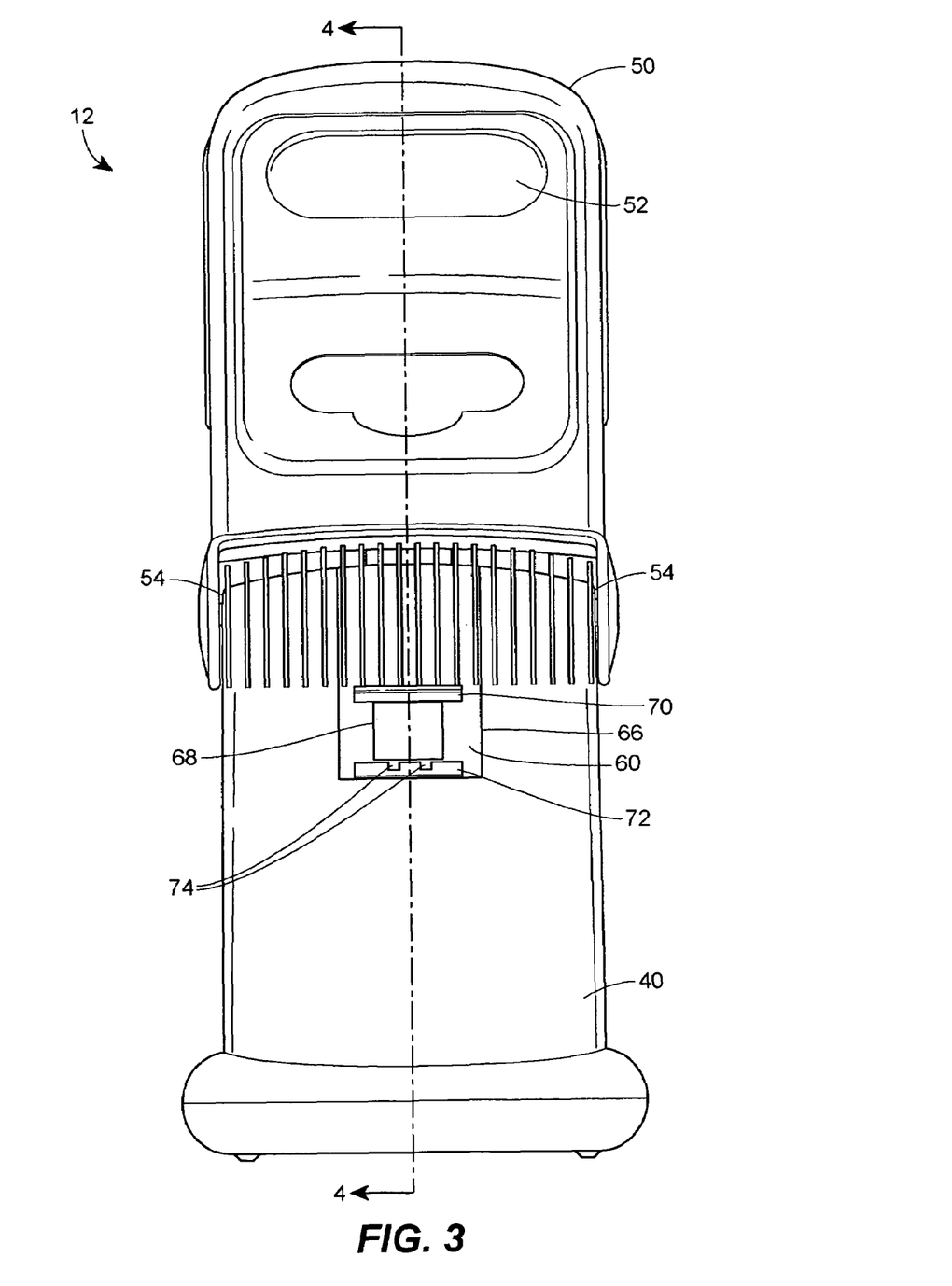
FIG. 3 is a rear view of the container of FIGS. 1 and 2.

As seen in the rear view of the container 12 in FIG. 3, the extruder portion 60 may be disposed within an opening 66 through the housing 40 of the container 12 and attached thereto such that the molding compound may be discharged through the extruder opening 68 to the exterior of the housing 40. The extruder portion 60 may further include a die attachment mechanism in the form of upper die attachment 70 and lower die attachment 72 configured to receive the dies 16 therebetween to position the openings of the dies 16 proximate the extruder opening 68. In order to properly align the openings of the dies 16 with the extruder opening 68, the lower die attachment 72 may include notches 74 therein that may engage corresponding detents of the dies 16 to properly align the openings of the dies 16 with the extruder opening 68.

Figure 4:
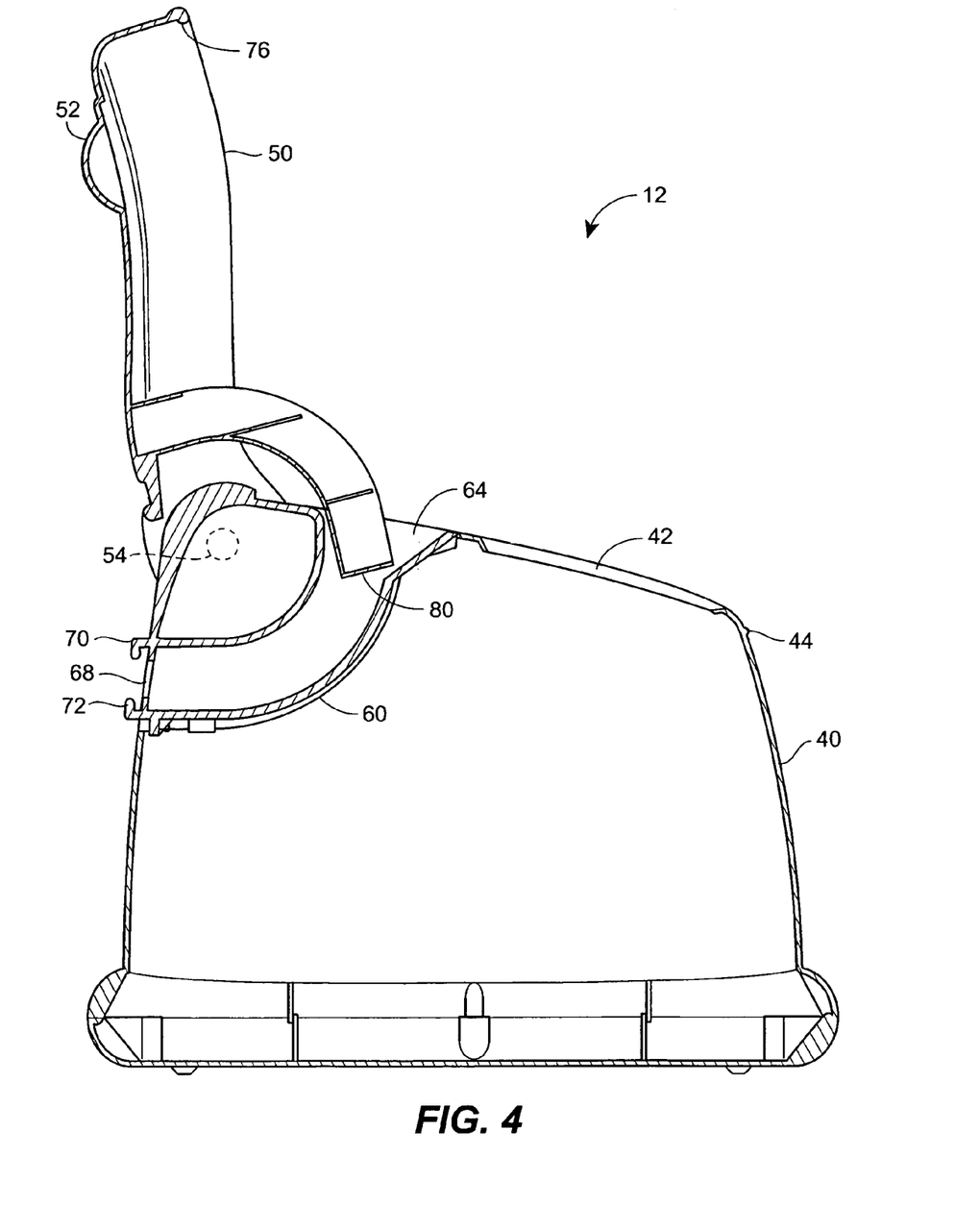
FIG. 4 is a cross-sectional view through line 4-4 of FIG. 3 of the container of FIGS. 1 and 2.

As shown in FIG. 3 and further in FIG. 4, the extruder portion 60 may be fabricated as a separate component from the housing 40 of the container 12 that may be attached separately to and disposed within the housing 40 during the process of assembling the container 12. Alternatively, the extruder portion 60 and the housing 40 may be integrally formed as a single component such that no further assembly of the extruder portion 60 to the housing 40 is necessary after the components are formed. Similarly, the lid 50 and plunger 62 may be formed as a single integral component as shown in FIG. 4, or may be fabricated separately with the plunger 62 being attached to an inner surface of the lid 50 during the process of assembling the container 12. Once the container 12 is assembled, the lid 50 may be open to the position shown in FIG. 4 such that the container opening 42 is accessible. With the lid 50 open, the accessories of the extrusion set 10 may be inserted into the housing 40 of the container 12 through the opening 42. Once the accessories are stored within the housing 40, the lid 50 may be rotated toward the closed position shown in FIG. 5. The lid 50 may include an inwardly extending lip 76 providing a surface for engaging the detent 44 extending outwardly from the housing 40 to retain the lid 50 in the closed position until the user engages the lid 50 to open to the container 12.

Figure 5:
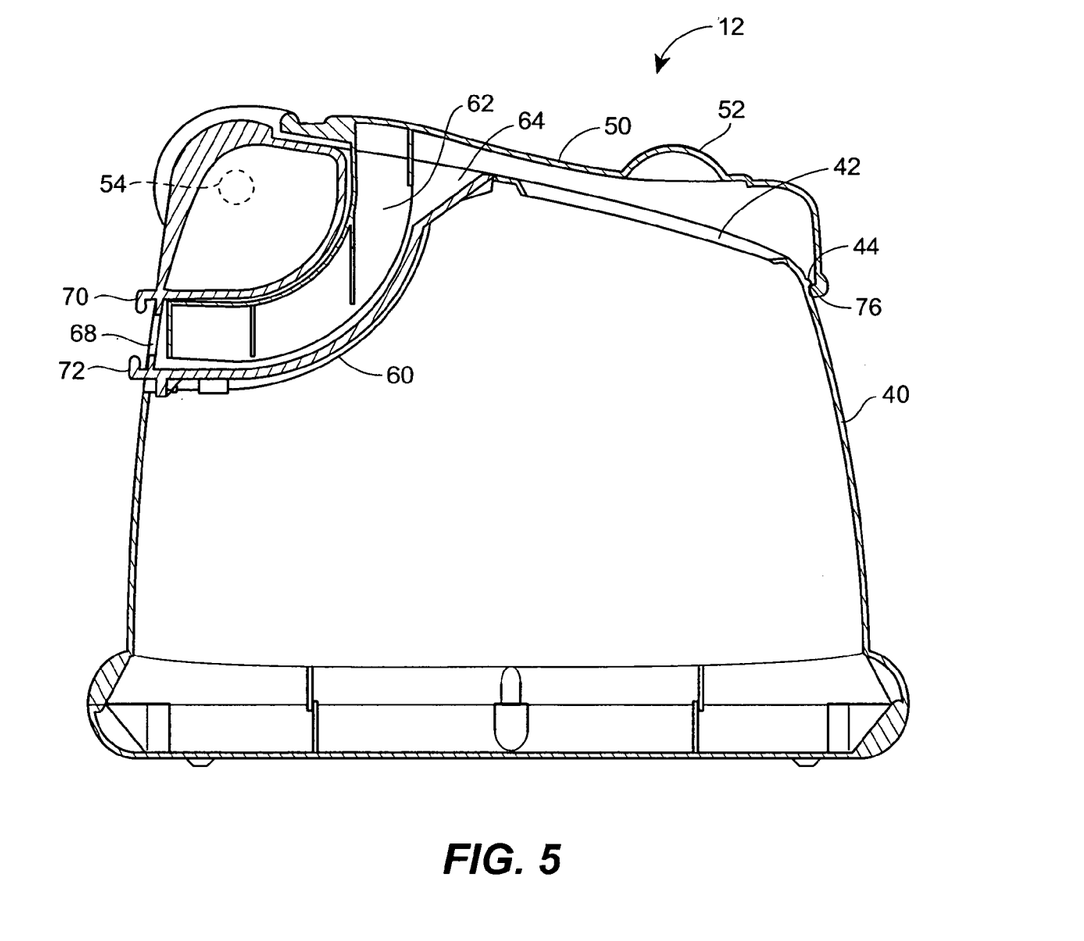
FIG. 5 is a cross-sectional view through line 4 of FIG. 3 of the container of FIG. 1 with the lid in a closed position.
Figure 6:
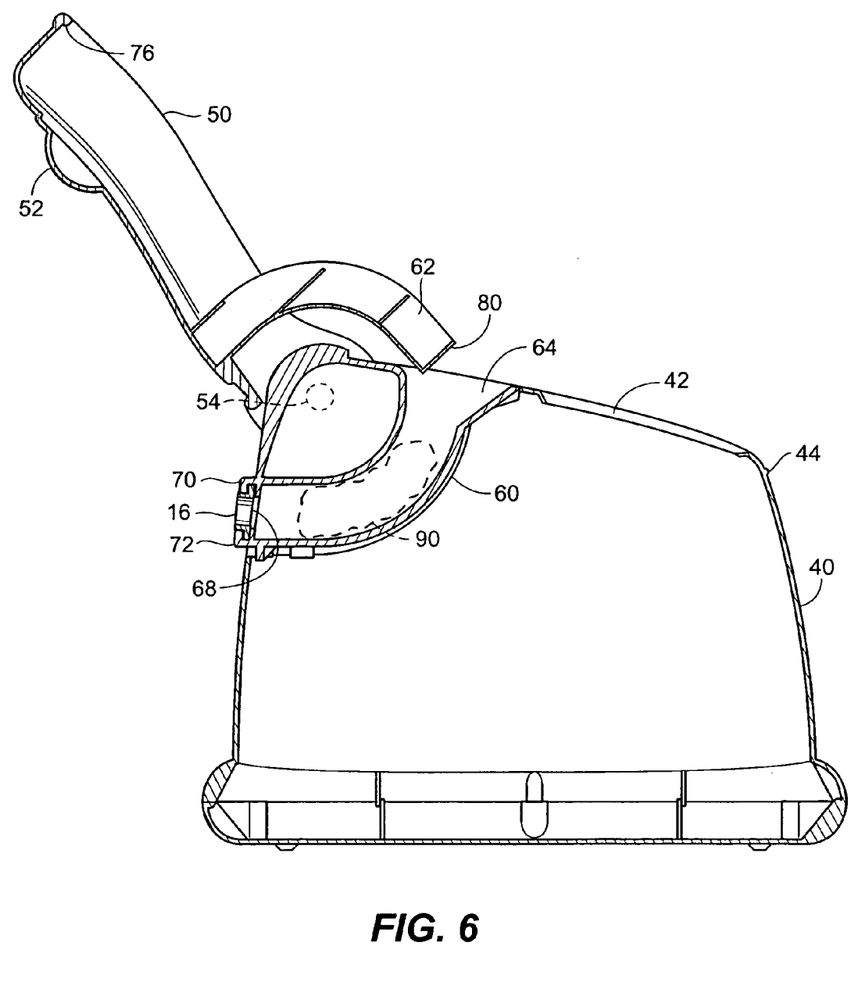
FIG. 6 is a cross-sectional view through line 4-4 of FIG. 3 of the container of FIG. 1 with the lid in a fully open position and a quantity of molding compound disposed in the receiving chamber of the extruder portion.
Figure 7:
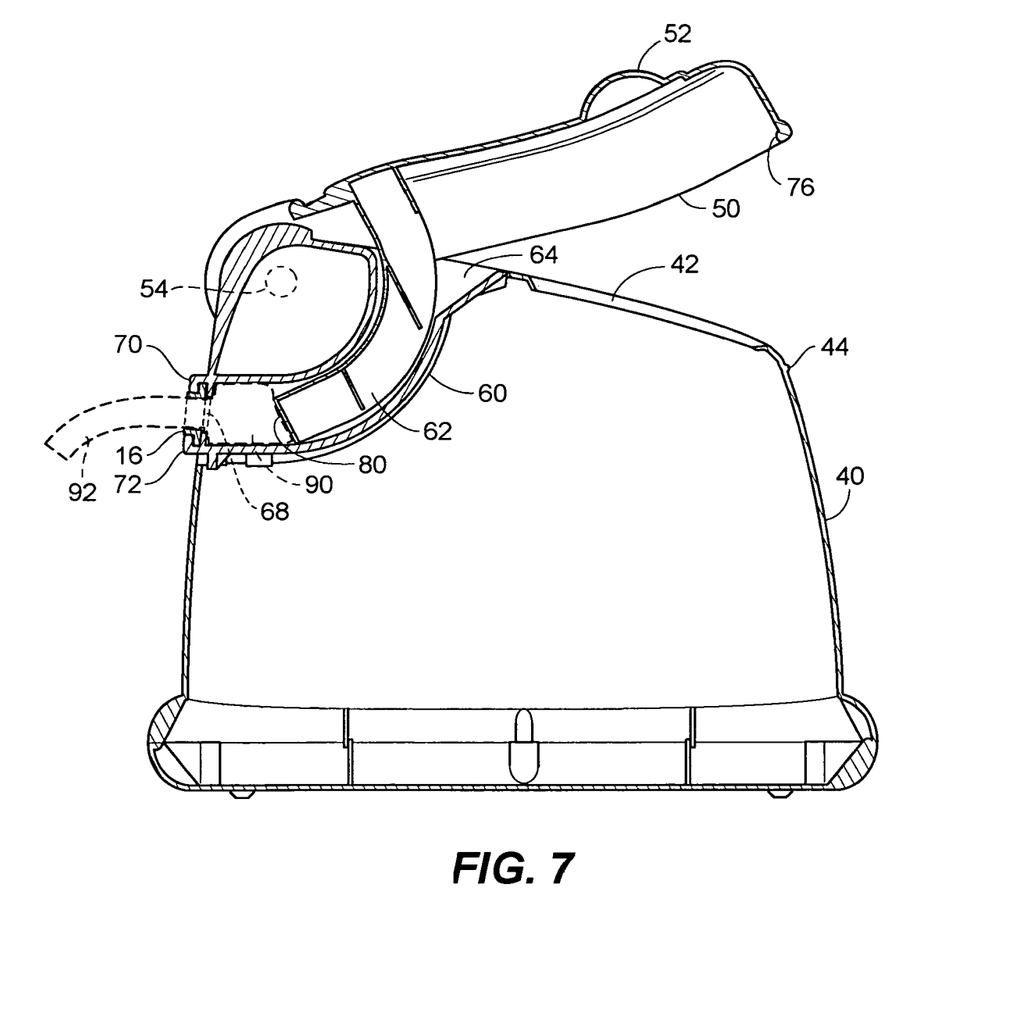
FIG. 7 is a cross-sectional view through line 4-4 of FIG. 3 of the container of FIG. 1 with the lid in a partially closed position and extruding quantity of molding compound through the extruder opening.

The extrusion of a quantity of the molding compound will now be discussed with respect to FIGS. 5-7. In order to begin the extrusion process, the user may open the lid 50 to the position shown in FIG. 6 such that the plunger 62 is removed from the receiving chamber 64 of the extruder portion 60. With the plunger 62 removed from the receiving chamber 64, a quantity of the molding compound 90 may be inserted into the receiving chamber 64 by the user and pushed downwardly towards the extruder opening 68. Once the quantity of molding compound 90 is inserted into the receiving chamber 64, the user may grasp the lid 50 and rotate the lid 50 downwardly toward the closed position with the plunger 62 moving into the receiving chamber 64. As the plunger 62 moves into the receiving chamber 64, a leading surface 80 of the plunger 62 may engage the quantity of molding compound 90 disposed within the receiving chamber 64 to force the quantity of molding compound 90 toward the extruder opening 68 and, if attached, a corresponding opening of a die 16 attached to the extruder portion 60. As the lid 50 and plunger 62 continue to move towards the position shown in FIG. 7, the portion of the quantity of molding compound 90 opposite the leading surface 80 of the plunger 62 may be forced through the extruder opening 68 and die 16 to discharge an extrusion 92 of the molding compound having a cross-section approximating the cross-section of the opening of the die 16. As the lid 50 and plunger 62 continue to move to the closed position shown in FIG. 5, a majority of the quantity of molding compound 90 may be forced through the extruder opening 68 by the leading surface 80 of the plunger 62.

Figure 8:
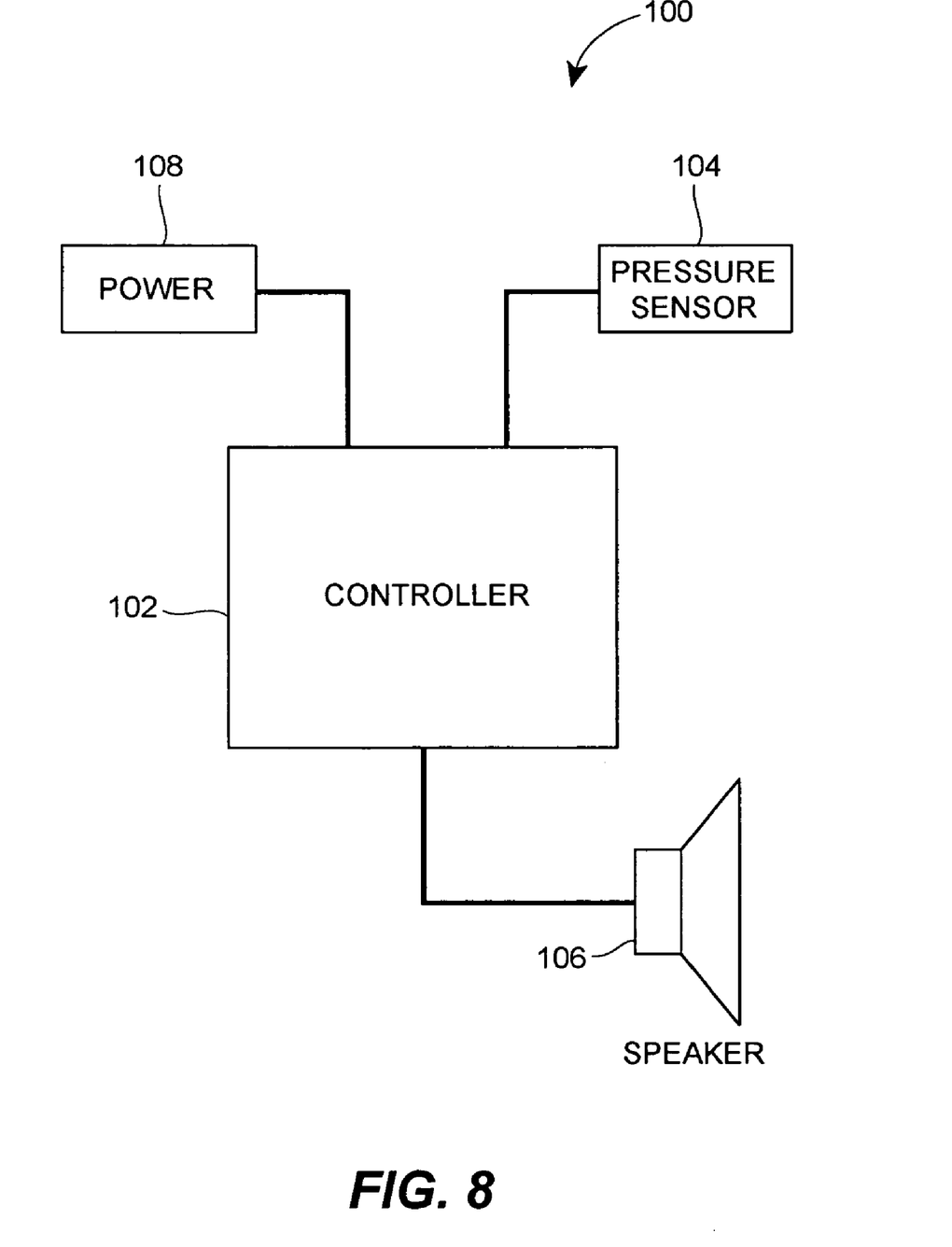
FIG. 8 is a block diagram of the electronic components of a sound generation mechanism for the container of FIG. 1.

In an alternative embodiment, the container 12 may be configured to broadcast sounds corresponding to the extrusion of the quantity of molding compound 90 as the plunger 62 forces the molding compound 90 through the extruder opening 68. In certain embodiments, sound may be produced by mechanical means, such as by the lid 50, the plunger 62, or component thereof engaging a component of the housing 40 or extruder portion 60 to generate an audible sound as the lid 50 and plunger 62 move toward the closed position. As another alternative, sound may be generated through electrical or electromechanical means as the plunger 62 applies pressure to the quantity of the molding compound disposed within the receiving chamber 64 of the extruder portion 60. FIG. 8 is a block diagram of a number of components that may be incorporated in a sound generation mechanism 100. Referring to FIG. 8, the sound generation mechanism 100 may include a controller 102 containing the sound generation data implemented via circuitry contained on a conventional printed circuit board, with the sound generation data being stored directly on the printed circuit board. It should be appreciated that although the controller 102 may be implemented on a printed circuit board, more complex implementations of the container 12 may be implemented wherein the controller 102 may comprise, among other components, a program memory, a microcontroller or microprocessor (MP), a random-access memory (RAM), read-only memory (ROM) and an input/output (I/O) circuit, all of which may be interconnected. It should be appreciated that the controller 102 may include multiple microprocessors. Similarly, the memory of the controller 102 may include multiple RAMs and multiple program memories, depending on the complexity and requirements of a specific implementation. It should also be appreciated that the I/O circuit may include a number of different types of I/O circuits, such as sound generation circuits, video generation circuits, odor generation circuitry, and the like. The RAM(s), ROM(s) and program memories may be implemented as semiconductor memories, magnetically readable memories, and/or optically readable memories, for example.

FIG. 8 illustrates that the controller 100 may be operatively coupled to an activation device 104 and a speaker 106, each of those components being so coupled via a respective direct line or conductor. In addition, the controller 102 may be operatively coupled to a power supply 108. Different connection schemes could be used. The power supply 108, which may be batteries inserted into a battery compartment of the container 12, an external battery, a power cord connected to a wall outlet, or any other appropriate source of electrical power, such that the power supply 108 may provide power to the controller 102, circuitry and other components 104, 106. Input signals produced by the activation device 104 are output to the controller 100 for processing by the sound generation logic of the controller 102. Depending on the processing performed, the circuitry of the controller 102 generates and outputs sound generation signals to the speaker 106, wherein the speaker 106 translates the output signals into sounds that are broadcast such that the sounds may be heard by the users of the container 12 when extruding the molding compound. The general and specific technologies relating to electronic sound generation circuitry, and the software required to run such devices, are well known to those skilled in the electronic and software arts, and therefore the specific details of the digital processing and memory portions of such circuitry, and the specific details of any software required for this specific application will not be described further herein.

While the output device or mechanism for the container 12 is illustrated herein as the speaker 106 which may broadcast sounds that may be audibly perceptible to the players, those skilled in the art will understand that the container 12 may be implemented with any desired output device capable of conveying the extrusion of the molding compound in any manner that may be perceptible to the users. For example, in an alternative embodiment, the output device for the container 12 may be a visual display corresponding to the extrusion process. Other output devices or mechanisms may be implemented in the container 12 as desired, and are contemplated by the inventor as having use with the extrusion set 10 and container 12 of the present invention.

The sound generation mechanism 100 may be implemented in the container 12 such that the activation device 104 may detect the plunger 62 applying a force to the quantity of molding compound 90 during the extrusion process. In one embodiment, the activation device 104 may be a pressure sensor disposed between the plunger 62 and the surface of the lid 50. When the lid 50 is closed and the leading surface 80 of the plunger 62 engages the molding compound 90, the pressure sensor may be compressed by movement of the plunger 62 toward the lid 50, and transmit a corresponding actuation signal to the controller 102. Alternatively, the pressure sensor may be disposed at the leading surface 80 of the plunger 62 such that the pressure sensor may be actuated by the molding compound 90 being engaged by the leading surface 80 of the plunger 62. As a further alternative, the activation device 104 may be a strain gauge attached to a surface of the plunger 62 or the lid 50. In this embodiment, the controller 102 may be programmed to detect changes in the strain gauge resulting from the forces between the plunger 62 and the molding compound 90, and to cause the speaker 106 to output sounds in response to such changes. In these embodiments, the sound generation mechanism 100 may generate sounds when the molding compound 90 is being extruded, and not generate sounds when the lid 50 is opened and closed without molding compound 90 in the receiving chamber 64. Those skilled in the art will understand that other sound generation mechanisms may be implemented in the container 12 to generate sounds in a similar manner, and are contemplated by the inventor as having use with the present invention.

While the preceding text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

What is claimed is:

1. A toy for extruding a deformable molding compound, comprising:
   a container comprising:
      a container portion having a housing defining a cavity and a container opening, wherein the container opening and the cavity are configured to receive components of a molding compound extrusion set;
      a lid portion moveably attached to the container portion and moveable between an open position wherein the container opening is accessible from the exterior of the container and a closed position overlying the container opening with an outer edge of the lid portion surrounding the container opening; and
   an extruder assembly comprising:
      a plunger portion attached to the lid portion, and
      an extruder portion disposed within the cavity of the container portion, the extruder portion having an extruder opening and a receiving chamber, wherein the receiving chamber is configured to receive a quantity of the molding compound, and to receive the plunger portion when the lid portion moves from the open position to the closed position,
   wherein the plunger portion engages a quantity of modeling compound disposed in the receiving chamber to force the modeling compound through the extruder opening when the lid portion moves from the open position to the closed position.

2. A toy in accordance with claim 1, wherein the plunger portion is attached to an inner surface of the lid portion.

3. A toy in accordance with claim 1, wherein the plunger portion is integrally formed with the lid portion as a unitary component.

4. A toy in accordance with claim 1, wherein the lid portion is pivotally attached to the container portion and moves through an arcuate path between the open position and the closed position.

5. A toy in accordance with claim 1, comprising a die attachment mechanism disposed on the exterior of the container portion proximate to the extruder opening and configured to demountably attach a die proximate to the extruder opening so that the modeling compound forced through the extruder opening is also forced through an opening of the die to extrude the modeling compound in a cross-sectional shape corresponding to the shape of the opening of the die.

6. A toy in accordance with claim 1, comprising:
   an activation device operatively coupled to at least one of the plunger portion and the lid portion such that the activation device is actuated when the plunger portion engages the modeling compound to force the modeling compound through the extruder opening; and
   an output device operatively coupled to the activation device, wherein the output device outputs a sensory-perceptible output in response to the actuation of the activation device.

7. A toy in accordance with claim 6, wherein the activation device comprises a pressure sensor and the output device comprises a speaker.

8. A toy for extruding a deformable molding compound, comprising:
   a container comprising:
      a container portion having a housing defining a cavity and a container opening, wherein the container opening and the cavity are configured to receive components of a molding compound extrusion set;
a lid portion moveably attached to the container portion and moveable between an open position wherein the container opening is accessible from the exterior of the container and a closed position overlying the container opening;
an extruder assembly comprising:
  a plunger portion attached to the lid portion, and
  an extruder portion disposed within the cavity of the container portion, the extruder portion having an extruder opening and a receiving chamber, wherein the receiving chamber is configured to receive a quantity of the molding compound, and to receive the plunger portion when the lid portion moves from the open position to the closed position; and
an attachment mechanism having a first attachment surface disposed on the container portion and a second attachment surface disposed on the lid portion, wherein the attachment surfaces are configured to engage each other when the lid portion is in the closed position to detachably retain the lid portion in the closed position,
wherein the plunger portion engages a quantity of modeling compound disposed in the receiving chamber to force the modeling compound through the extruder opening when the lid portion moves from the open position to the closed position.

9. A toy for extruding a deformable molding compound, comprising:
a container having a storage portion having a container opening and being configured to receive and store components of a molding compound extrusion set, and an extruder portion having an extrusion opening and a receiving chamber configured to receive a quantity of the modeling compound; and
a lid moveably attached to the container and moveable between an open position and a closed position with an outer edge of the lid portion surrounding the container opening, and having a plunger extending therefrom, wherein the receiving chamber is configured to receive the plunger when the lid moves from the open position to the closed position,
wherein the plunger engages a quantity of modeling compound disposed in the receiving chamber to force the modeling compound through the extruder opening as the lid moves from the open position to the closed position.

10. A toy in accordance with claim 9, wherein the plunger is attached to an inner surface of the lid.

11. A toy in accordance with claim 9, wherein the plunger is integrally formed with the lid as a unitary component.

12. A toy in accordance with claim 9, wherein the lid is pivotally attached to the container and moves through an arcuate path between the open position and the closed position.

13. A toy in accordance with claim 9, comprising a die attachment mechanism disposed on the exterior of the container proximate to the extruder opening and configured to demountably attach a die proximate to the extruder opening so that the modeling compound forced through the extruder opening is also forced through an opening of the die to extrude the modeling compound in a cross-sectional shape corresponding to the shape of the opening of the die.

14. A toy in accordance with claim 9, comprising:
an activation device operatively coupled to at least one of the lid and the plunger such that the activation device is actuated when the plunger engages the modeling compound to force the modeling compound through the extruder opening; and
an output device operatively coupled to the activation device, wherein the output device outputs a sensory-perceptible output in response to the actuation of the activation device.

15. A toy in accordance with claim 14, wherein the activation device comprises a pressure sensor and the output device comprises a speaker.

16. A toy for extruding a deformable molding compound, comprising:
a container having a storage portion configured to receive and store components of a molding compound extrusion set, and an extruder portion having an extrusion opening and a receiving chamber configured to receive a quantity of the modeling compound;
a lid moveably attached to the container and moveable between an open position and a closed position, and having a plunger extending therefrom, wherein the receiving chamber is configured to receive the plunger when the lid moves from the open position to the closed position; and
a locking mechanism comprising a first locking surface disposed on the container and a second locking surface disposed on the lid, wherein the locking surfaces are configured to engage each other when the lid is in the closed position to detachably retain the lid in the closed position,
wherein the plunger engages a quantity of modeling compound disposed in the receiving chamber to force the modeling compound through the extruder opening as the lid moves from the open position to the closed position.

17. A toy for extruding a deformable molding compound, comprising:
a container having a storage portion having a container opening and being configured to receive and store components of a molding compound extrusion set, and an extruder portion having an extrusion opening and a receiving chamber configured to receive a quantity of the modeling compound; and
a lid pivotally attached to the container and moveable between an open position and a closed position with an outer edge of the lid portion surrounding the container opening, and having a plunger extending from an inner surface of the lid, wherein the receiving chamber is configured to receive the plunger when the lid pivots from the open position to the closed position,
wherein the plunger engages a quantity of modeling compound disposed in the receiving chamber to force the modeling compound through the extruder opening as the lid pivots from the open position to the closed position.

18. A toy in accordance with claim 17, wherein the plunger is integrally formed with the lid as a unitary component.

19. A toy in accordance with claim 17, comprising a die attachment mechanism disposed on the exterior of the container proximate the extruder opening and configured to demountably attach a die proximate the extruder opening so that the modeling compound forced through the extruder opening is also forced through an opening of the die to extrude the modeling compound in a cross-sectional shape corresponding to the shape of the opening of the die.

20. A toy in accordance with claim 17, comprising:
an activation device operatively coupled to at least one of the lid and the plunger such that the activation device is actuated when the plunger engages the modeling compound to force the modeling compound through the extruder opening; and
an output device operatively coupled to the activation device, wherein the output device outputs a sensory-perceptible output in response to the actuation of the activation device.

21. A toy in accordance with claim 20, wherein the activation device comprises a pressure sensor and the output device comprises a speaker.

22. A toy for extruding a deformable molding compound, comprising:
a container having a storage portion configured to receive and store components of a molding compound extrusion set, and an extruder portion having an extrusion opening and a receiving chamber configured to receive a quantity of the modeling compound;
a lid pivotally attached to the container and moveable between an open position and a closed position, and having a plunger extending from an inner surface of the lid, wherein the receiving chamber is configured to receive the plunger when the lid pivots from the open position to the closed position; and
a locking mechanism comprising a first locking surface disposed on the container and a second locking surface disposed on the lid, wherein the locking surfaces are configured to engage each other when the lid is in the closed position to detachably retain the lid in the closed position,
wherein the plunger engages a quantity of modeling compound disposed in the receiving chamber to force the modeling compound through the extruder opening as the lid pivots from the open position to the closed position.

23. A toy in accordance with claim 22 wherein the first locking surface comprises a detent and the second locking surface comprises a lip of the lid that engages the detent when the lid is in the closed position.

24. A toy in accordance with claim 22 wherein the first locking surface is an outer surface of the container and the second locking surface is an inner surface of the lid.

25. A toy in accordance with claim 8 wherein the first attachment surface comprises a detent and the second attachment surface comprises a lip of the lid that engages the detent when the lid is in the closed position.

26. A toy in accordance with claim 8 wherein the first attachment surface is an outer surface of the container portion and the second attachment surface is an inner surface of the lid.

27. A toy in accordance with claim 16 wherein the first locking surface comprises a detent and the second locking surface comprises a lip of the lid that engages the detent when the lid is in the closed position.

28. A toy in accordance with claim 16 wherein the first locking surface is an outer surface of the container and the second locking surface is an inner surface of the lid.

* * * * *

UNITED STATES PATENT AND TRADEMARK OFFICE
CERTIFICATE OF CORRECTION

PATENT NO. : 7,275,924 B1
APPLICATION NO. : 11/118923
DATED : October 2, 2007
INVENTOR(S) : Jared Kreuzer It is certified that error appears in the above-identified patent and that said Letters Patent is hereby corrected as shown below:

On the First Page:

At field (74), "Marshall" should be -- Marshall, --.

Signed and Sealed this

Nineteenth Day of August, 2008

JON W. DUDAS
*Director of the United States Patent and Trademark Office*